May 19, 1970  L. F. MOORE ET AL  3,512,473
COVER ASSEMBLY FOR DEEP FAT FRYER
Filed Feb. 19, 1968  2 Sheets-Sheet 1
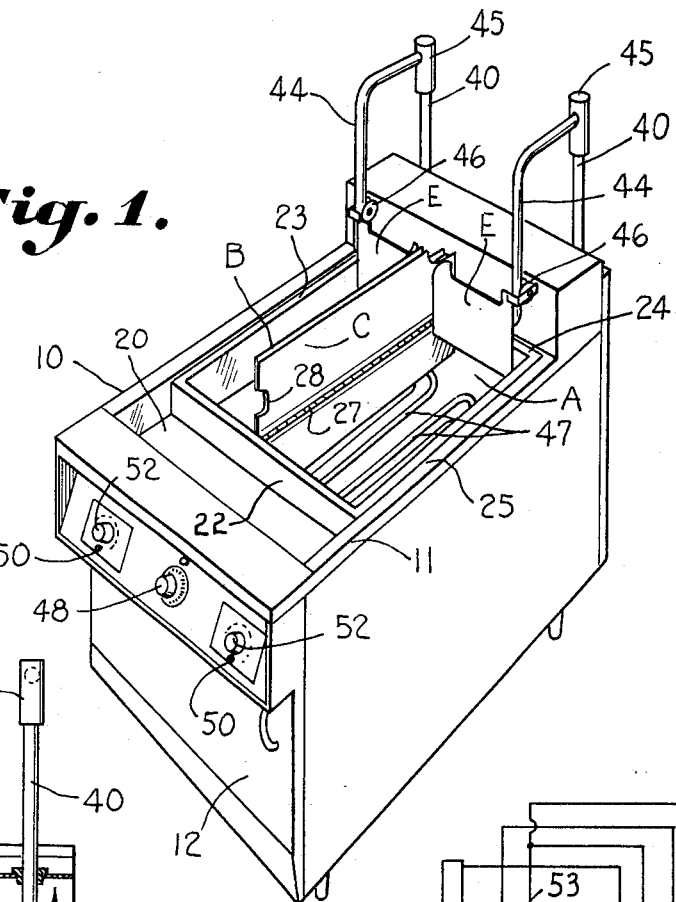
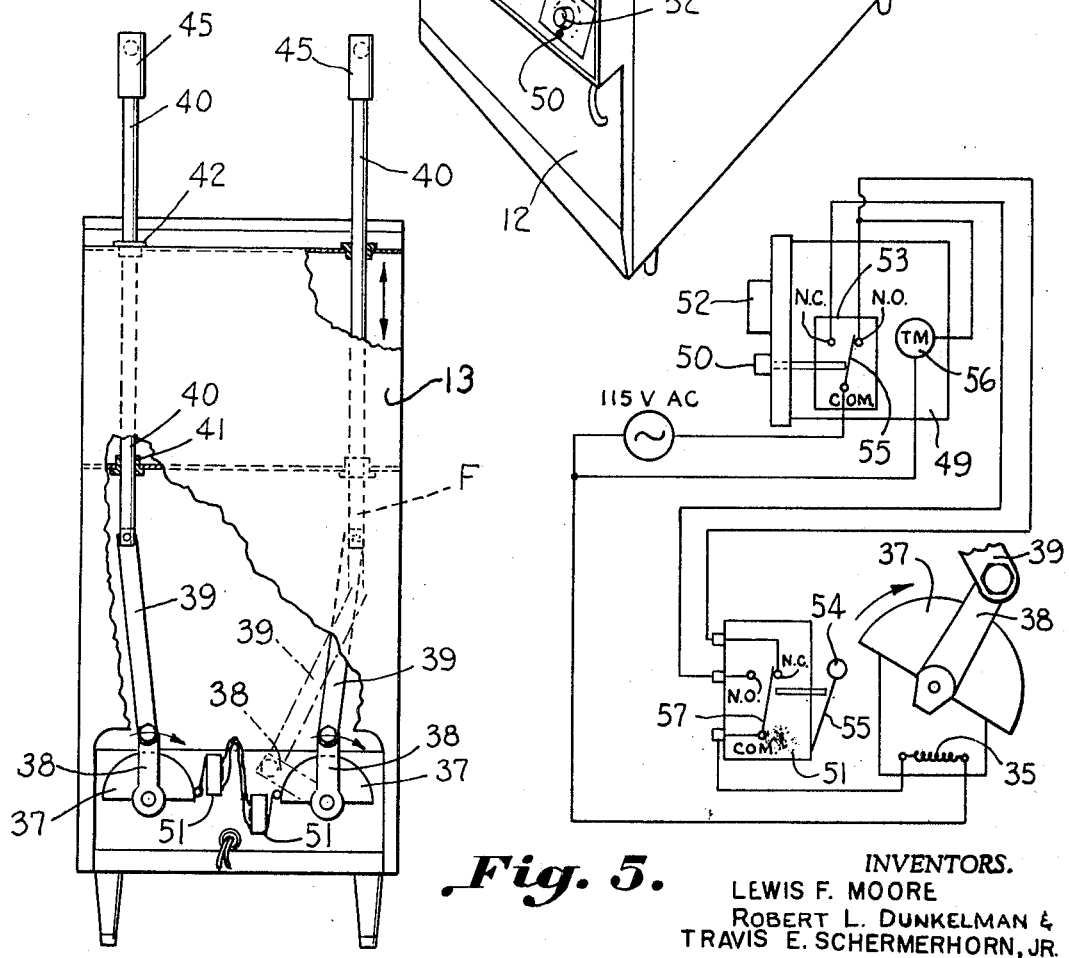
INVENTORS.
LEWIS F. MOORE
ROBERT L. DUNKELMAN &
TRAVIS E. SCHERMERHORN, JR.
BY *Bailey & Daily*
ATTORNEYS.

May 19, 1970     L. F. MOORE ET AL     3,512,473

COVER ASSEMBLY FOR DEEP FAT FRYER

Filed Feb. 19, 1968     2 Sheets-Sheet 2

INVENTORS.
LEWIS F. MOORE
ROBERT L. DUNKELMAN, &
TRAVIS E. SCHERMERHORN, JR.

BY

ATTORNEYS.

United States Patent Office 3,512,473
Patented May 19, 1970

3,512,473
COVER ASSEMBLY FOR DEEP FAT FRYER
Lewis F. Moore, Robert L. Dunkelman, and Travis E. Schermerhorn, Jr., Shreveport, La., assignors to The Frymaster Corporation, Shreveport, La., a corporation of Louisiana
Filed Feb. 19, 1968, Ser. No. 706,414
Int. Cl. A47j *37/12*
U.S. Cl. 99—407             6 Claims

ABSTRACT OF THE DISCLOSURE

A deep fat fryer provided with a pair of independently operable lifting mechanisms for automatically raising and lowering a basket into a cooking vat. A cover assembly is provided for the deep fat fryer which includes a pair of hinged lids for covering the top of the vat when such are in a closed position. The lids can be independently closed so that edibles can be cooked in a substantially closed compartment on one side of the vat, while the other side remains open. The lids are automatically raised responsive to the baskets being raised.

---

Figure 3:
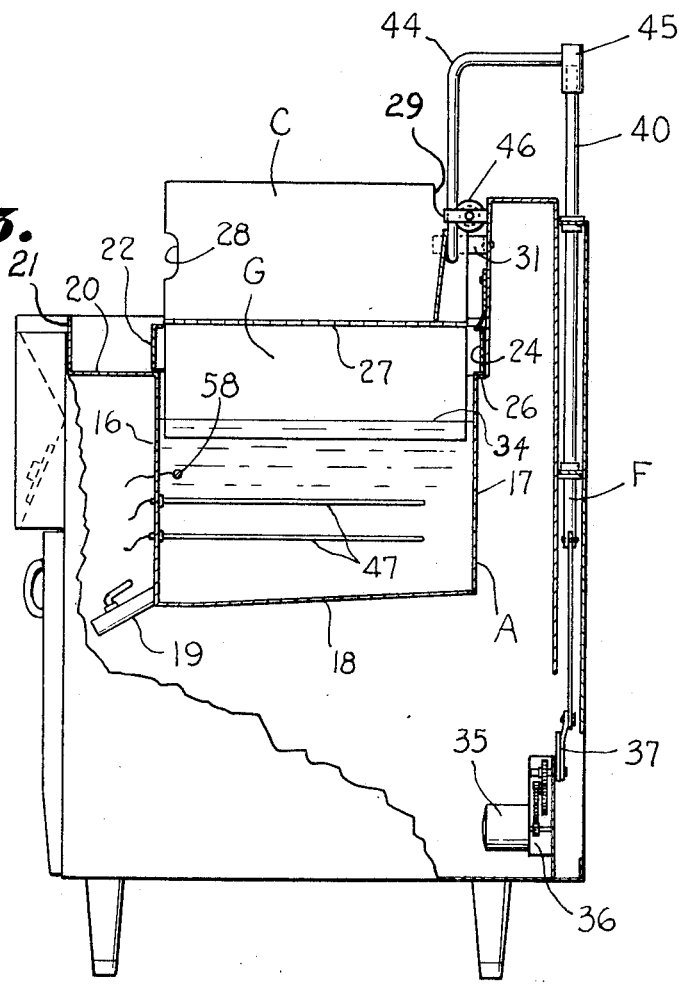

This invention relates to a deep fat fryer, and more particularly to a cover assembly for a deep fat fryer having a plurality of independently operable cooking baskets therein.

Frequently, when deep fat fryers are used in restaurants and the like, it is desirable to be able to cook more than one edible at a time. For example, it may be desired to cook fried chicken in one basket, while cooking French fries in another basket. In order to accomplish such deep fat fryers, such as illustrated in the Wells Pat. No. 3,242,849, and the Anetsberger Pat. No. 3,273,488 employ two sets of cooking baskets which may be used alternately. Such is satisfactory when, for example, the desired cooking environment for the edibles is the same. That is, in cooking french fries, it is desired that they be cooked uncovered, however, in cooking fried chicken in order to maintain the chicken moist and speed up the cooking operation it is desired that the chicken be covered so as to prevent evaporation of moisture.

A covered deep fat fryer also minimizes the splattering of grease during the cooking cycle, reduces oxidation of the shortening, allows cooking to take place at a 20° to 30° lower temperature which extends the life of the shortening, and also speeds up the cooking operation.

The deep fat fryer constructed in accordance with the present invention is provided with a pair of independently operable lifting mechanisms which allow cooking baskets to be automatically raised from the cooking vat after a predetemined period of time. The cover assembly is provided for completely covering the vat and upon raising one of the lifting mechanisms the lid directly above the basket is raised, while the lid covering the remainder of the vat can be maintained in the closed position. In order to provide a closed compartment above the basket when the lid is in the closed position a vertical panel extends downwardly into the shortening to prevent gases and juices from escaping from one side of the vat into the other side which may be open.

Accordingly, it is an important object of the present invention to provide a deep fat fryer with a cover assembly which allows edibles to be cooked in one side of the cooking vat under cover, while edibles can be cooked in the other side uncovered.

Another important object of the present invention is to provide a deep fat fryer with a cover assembly wherein, lids forming the cover assembly can be automatically raised responsive to raising the cooking baskets from the vat.

Still another important object of the present invention is to provide a deep fat fryer with a cover assembly which include vertical partitions for dividing the cooking vat into compartments.

Still another important object of the present invention is to provide a simple and effective lifting mechanism for automatically raising the covers of a deep fat fryer responsive to raising the basket.

Still another important object of the present invention is to provide a deep fat fryer in which the oxidation of shortening used therein can be minimized through the use of a cover assembly which encloses the cooking baskets when in a lowered position.

Still another important object of the present invention is to provide a cover assembly for a deep fat fryer which can be removed easily for cleaning purposes.

The construction designed to carry out the invention will be hereinafter described, together with other features thereof.

Figure 4:
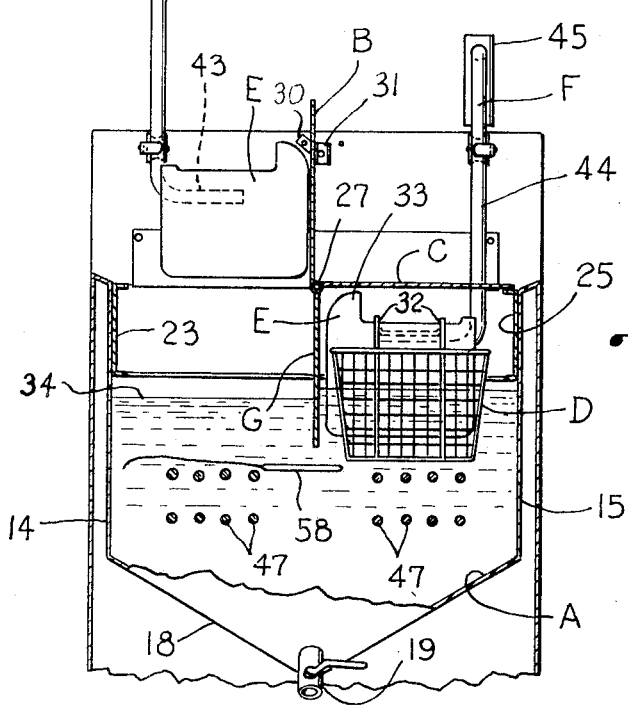

The invention will be more readily understood from a reading of the following specification and by reference to the accompanying drawings forming a part thereof, wherein an example of the invention is shown and wherein:

FIG. 1 is a perspective view illustrating a deep fat fryer constructed in accordance with the present invention with the cooking baskets removed and the lids of a cover assembly in a raised position, FIG. 2 is a rear elevational view, with parts broken away, illustrating the independently operable lifting mechanisms for the cooking baskets, FIG. 3 is a side elevational view, partially in section, of the deep fat fryer illustrating the cooking vat and lifting mechanisms, FIG. 4 is a front elevational view, partially in section, illustrating the upper portion of the deep fat fryer, and FIG. 5 is a schematic diagram of the control circuit for the deep fat fryer.

The drawings illustrate a deep fat fryer provided for cooking edibles comprising a vat A having side walls joined by end walls, and a bottom for receiving shortening for cooking. A removable cover assembly is provided for closing the vat. The cover assembly includes a pair of lids B and C, respectively, provided for independent opening so that a portion of the vat A can be opened while another portion of the vat can be maintained closed. A pair of baskets D are carried on respective basket supporting members E adjacent a respective lid so that when the basket is lowered into the vat one of the lids covers the lowered basket. Means F is provided for independently raising and lowering the basket so that the edibles carried in one basket can be cooked, with the lid closed, while the lid adjacent the other basket can be maintained in an opened position. The cover assembly includes a vertical partition G which is carried in the medial portion of the vat for dividing the vat into a pair of cooking compartments. The vertical partition G extends downwardly below the normal level of the shortening so that the compartments are defined by the vertical partition, one of the side walls of the vat, a portion of the end walls, the shortening, and one of the lids. Each basket D is carried within a respective compartment so that the area above said basket is enclosed when the lid is in a down position.

Referring more particularly to the drawings, such illustrate a deep fat fryer comprising an outer casing made up of a left-side wall 10, and a right-side wall 11, being joined by a front wall 12, and a rear vertical wall 13. Disposed interiorly of the housing is the vat A which includes a pair of vertical side walls 14 and 15, which are joined by a front wall 16 and a rear wall 17. A V-shaped bottom 18 joins the walls and is inclined downwardly from the rear wall 17 to the front wall 16 so that the shortening can be drained from the vat through a drain plug 19 carried adjacent the bottom of the front wall 16.

The front wall 16 extends upwardly to a point slightly below the top of the housing, and then bends forwardly as at 20, and terminates in an upwardly extending portion 21. The portions 20 and 21 are secured to the side walls 10 and 11 of the housing in a sealed manner so as to define a rectangular boil-up receptacle. Thus, when frying french fries and the like, with the lids B and C open, any shortening that boils-up from the vat A will be caught in the boil-up receptacle and returned to the vat.

The cover assembly for the deep fat fryer includes a rectangular frame constructed of channel shaped walls 22 through 25, respectively. The front wall 22 of the rectangular frame rests on the edge of the forwardly extending portion 20 of the boil-up receptacle, and the rear channel 24 rests on a ridge adjacent the rear of the vat A for supporting such. Thus, the cover assembly can be readily removed for cleaning. The lids B and C are connected by means of a piano-hinge 27 between the central portion of the front and rear channel shaped walls 22 and 24, respectively. Each of the lids can be independently raised or lowered and have a recessed portion 28 adjacent the front thereof for accommodating the handle of the basket D when in a lowered position. The outer corner 29 of the lids adjacent the rear walls of the vat is also recessed for accommodating the lifting mechanism. Each of the lids B and C have a protruding member 30 carried thereon, with a hole therein through which a pin can be inserted when the lid is in the raised position to hold such in that position. The pin extends through the hole in the protruding member 30 and into a bracket carried on the rear wall of the oven. Other suitable means could be utilized for maintaining the covers in the raised position. For example, a U-shaped clamp can be positioned over the edges of the covers when they are in the raised position to hold both covers upright. It is noted that there is a U-shaped spring wire member 31 carried on the rear wall of the housing which contacts the lids B and C when they are in the raised position so that as the lifting mechanism F is lowered the spring wire will tend to force the lids downwardly to cover the vat. As previously mentioned, when it is desired to maintain the lids in the open position when the baskets are lowered a pin can be inserted through the protruding member 30 for locking such in position.

A pair of foraminous baskets D are carried on the basket supporting members E so that such can be automatically raised and lowered into the vat by the lifting mechanism F. The baskets have a pair of hook-shaped members 32 which extend over the upper edge of the supporting member E. A handle (not shown) extends outwardly from the front of the baskets for lifting such off of the basket supporting members E and from the vat.

The basket supporting members E is a vertical plate which is tilted slightly from the vertical axis so that the rear wall of the basket D can rest flush thereagainst, and be maintained horizontally. A curved upwardly extending protrusion 33 is integral with the inner corner of the basket supporting member E and engages the lower side of a lid to raise such when the lifting mechanism raises the basket. Thus, it can be seen that as the basket is raised from the vat the protrusion 33 engages a lid to raise such.

A vertical partition G extends downwardly from adjacent the piano-hinge 27 below the normal level of the shortening carried in the vat A. Such, in effect, produces two separate cooking compartments, each of which has an independently operated cooking basket therein. One advantage of such arrangement is that an item can be cooked or fried in one side of the vat with the lid down so as to produce a substantially closed compartment, minimizing the loss of natural juices during the cooking operation, while the lid for the other side of the vat can be maintained in a raised position. By allowing the partition G to extend below the normal level of the shortening, juices from the side of the vat in which chicken or the like, is being cooked cannot escape to the other side of the vat. Moreover, by providing the deep fat fryer with a cover, cooking can take place with the shortening at 20° to 30° lower than normal, thus extending the life thereof.

Each side of the deep fat fryer is provided with an independently operable lifting mechanism F for raising and lowering the baskets D. Referring in detail to FIGS. 2 and 3, each lifting mechanism is provided with an independently operable electric motor 35. The electric motor 35 is coupled through a reduction gear 36 to a semi-circular cam 37 which has an arm 38 extending radially therefrom. A connecting rod 39 has one end journalled to the radially extending arm 38 so that as the radial extending arm rotates such reciprocates vertically. A lifting rod 40 is journalled to the upper end of the connecting rod 39 and reciprocates therewith. The lifting rod 40 is journalled between a lower bearing 41 suitably mounted on the rear of the housing, and an upper bearing 42 carried adjacent the top of the housing. The basket supporting means E are welded to an inwardly extending lower end 43 of a connecting arm 44 which has a sleeve 45 integral with the other end. The sleeve 45 has a vertical hole therein so that such can slip on the top of the lifting rod 40. It is noted that the connecting arm 44 extends forwardly over the rear of the fryer and then bends downwardly to the inwardly extending bottom 43. Guide pulleys 46 are mounted on the housing for guiding the connecting arm 44 when such is reciprocated vertically. Since the sleeve 45 of the connecting arm merely slips on the upper end of the lifting rod 40, such can be readily removed for cleaning.

The controls for raising and lowering one of the baskets D into the vat are illustrated in FIG. 5. The controls for the other basket are identical thereto, and the electrical heating elements 47 are connected to a 230 volt source (not shown) with a thermostat in series therewith, so that the shortening in the fryer can be maintained at a desired constant temperature. A variable control knob 48 is carried on the front control panel for setting the desired temperature of the shortening. Heat could also be supplied by other suitable means such as by gas, liquid or vapor heat transfer jacketing, etc.

The controls for each of the lifting mechanisms include a conventional electric timer 49, a push to start button 50, and a two pole switch 51 which is activated by the movement of the semi-circular cam 37.

When the basket is in the raised position the timer dial 52 is on "0" and the timer switch 53 is making connection to the N.C. switch terminal. Correspondingly, the switch 51 near the basket lift motor is in the N.C. position also, because the actuating roller 54 mounted on arm 55 of the switch has just fallen off the surface of the cam 37. In order to start the sequence of events, that is, lowering the basket into the vat, first the timer dial 52 is rotated to set the cooking time. Nothing physically happens, circuit-wise when this is done.

After the basket is loaded with a suitable amount of food products the operator depresses the push to start button 50 on the face of the timer 49. This causes the contact arm 55 in the timer switch 53 to shift to the N.O. position, thus completing the circuit to the electric timer motor 56, as well as to the basket lift motor shown schematically by the coil 35. The timer switch 53 is an over-center type of klik switch such that the push to start button 50 only has to be depressed momentarily to positively actuate the switch 53, and does not need to be held down while the basket is being lowered. Such is a conventional switch, as well as the entire timer mechanism.

When the basket lift motor 35 is energized such causes the basket to be lowered into the vat and rotates the cam 37 in a clockwise direction. When the radially extending arm 38 is pointing directly downwardly the basket is in its lowermost position. At this time the cam 37 engages and depresses the roller actuator arm 55 of the switch 51 shifting the contact arm 57 from the N.C. contact to the N.O. contact, thus opening the circuit to the basket lift motor 35. The basket now is in the down position with the food being cooked therein, and the timer motor 56 is running. The timer motor will continue to run until the time set on the dial 52 expires, at which time the timer 49 automatically repositions the contact arm 55 to the N.C. position.

This causes the basket lift motor 35 to again be energized and the cam thus rotates another 180° until it arrives at the starting position, at which time the roller actuator 54 of the switch 51 falls off the cam, thus again opening the basket lift motor circuit and the basket at this time is returned to the "up" position.

As previously mentioned, the lifting motors 35 are driven by 115 volts A.C., while the heating elements 47 are energized from a 230 volt source. Other suitable voltages could be used. The thermostat 58, which controls the energization of the heating elements 47 for maintaining the shortening at a desired temperature, is carried intermediate the two cooking compartments so that a uniform temperature can be maintained throughout both compartments. This allows both sides of the fryer to be operated with a single thermostat.

While a preferred embodiment of the invention has been described using specific terms, such description is for illustrative purposes only, and it is to be understood that changes and variations may be made without departing from the spirit or scope of the following claims.

What is claimed is:

1. A deep fat fryer provided for cooking edibles comprising: a vat having side walls joined by end walls and a bottom for receiving shortening for cooking edibles; means carried by said fryer for heating said shortening; a cover assembly for said vat including, a pair of lids mounted on hinges carried by said assembly provided for covering the top of said vat when in a closed position; a pair of basket supporting members carried by said fryer; a basket carried on each of said basket supporting members adjacent a respective lid so that when a basket is lowered into said vat a lid, when in a closed position, covers said basket; and means for independently raising and lowering said baskets so that edibles carried in one basket can be cooked with the lid closed while the lid adjacent the other basket can be in an opened position.

2. The deep fat fryer as set forth in claim 1, wherein said cover assembly includes; a vertical partition carried by said vat extending thereacross for dividing said vat into a pair of cooking compartments, said vertical partition extending downwardly below the normal level of said shortening, each compartment being defined by said vertical partition, one of said side walls of said vat, a portion of said end walls, said shortening and one of said lids, said baskets being carried in a respective compartment so that the area above said baskets is enclosed when a lid for a respective compartment is in a closed position.

3. The deep fat fryer as set forth in claim 1, wherein each of said lids when closed is positioned in the path of a respective basket supporting member and is raised to an opened position by said basket supporting member when said respective basket supporting member and said basket carried thereon is raised from said vat.

4. The deep fat fryer as set forth in claim 2, wherein a thermostat is carried intermediate said compartments for controlling said means for heating to maintain a uniform heat throughout said vat.

5. The deep fat fryer as set forth in claim 1, wherein a boil-up receptacle is carried adjacent said vat and communicates therewith for returning shortening that has boiled over from said vat back to said vat.

6. A deep fat fryer for cooking edibles comprising: a vat having side walls joined by end walls and a bottom for receiving shortening for cooking edibles; a removable cover assembly for closing said vat; said cover assembly including a pair of lids provided for independent opening so that a portion of said vat can be opened while another portion of said vat can be closed; a pair of spaced lifting members; drive means for selectively applying vertical reciprocal motion to said lifting members; each of said lids having an opening therein through which a portion of respective lifting members extends into said vat when said lids are in a closed position; a basket supporting member carried by said portion of each of said lifting members; and a basket carried by each of said basket supporting members, whereby as said lifting members are raised said basket supporting members engage a respective lid for raising said lids therewith.

References Cited

UNITED STATES PATENTS

| 2,109,212 | 2/1938 | Ehrgott | 96—416 XR |
| 2,546,464 | 3/1951 | Martin | 99—336 |
| 2,550,758 | 5/1951 | Bemis | 99—410 |
| 3,242,849 | 3/1966 | Wells | 99—411 |
| 3,273,488 | 9/1966 | Anetsberger | 99—336 |

BILLY J. WILHITE, Primary Examiner

U.S. Cl. X.R.

99—336, 411, 416